United States Patent [19]

Roland et al.

[11] Patent Number: 5,223,240

[45] Date of Patent: Jun. 29, 1993

[54] METHOD OF PREPARING ZEOLITE Y

[75] Inventors: Eckehart Roland; Peter Kleinschmit, both of Hanau; Akos Kiss, Alzenau-Wasserlos; Frank Heindl, Rodenbach, all of Fed. Rep. of Germany

[73] Assignee: Degussa Aktiengesellschaft, Fed. Rep. of Germany

[21] Appl. No.: 817,968

[22] Filed: Jan. 8, 1992

Related U.S. Application Data

[63] Continuation of Ser. No. 566,037, Aug. 13, 1990, abandoned.

[30] Foreign Application Priority Data

Aug. 16, 1989 [DE] Fed. Rep. of Germany ....... 3927034

[51] Int. Cl.$^5$ .............................................. C01B 33/34
[52] U.S. Cl. .................... 423/713; 423/715; 423/DIG. 21; 502/79
[58] Field of Search ....... 423/700, 713, 715, DIG. 21; 502/79

[56] References Cited

U.S. PATENT DOCUMENTS

| | | | |
|---|---|---|---|
| 3,326,797 | 6/1967 | Young et al. | 423/328 |
| 3,374,182 | 3/1968 | Young | 423/328 |
| 4,703,025 | 10/1987 | Kokotailo et al. | 423/328 |
| 4,863,885 | 9/1989 | Degman, Jr. | 423/328 |
| 5,023,066 | 6/1991 | Gimpel et al. | 423/713 |

FOREIGN PATENT DOCUMENTS 37190490 12/1988 Fed. Rep. of Germany .

OTHER PUBLICATIONS

Jacobs et al., "Assignment of the hydroxyl Bando in the Infrared Spectra of Zeolites X and Y", J. Chem. Soc. Faraday Trans. I 69 (1973) pp. 373–386.

Primary Examiner—R. Bruce Breneman
Attorney, Agent, or Firm—Cushman, Darby & Cushman

[57] ABSTRACT

An aqueous suspension of zeolite NaY is treated in with sodium hydroxide solution. The treated zeolite NaY is subsequently dealuminized with silicon tetrachloride.

2 Claims, 4 Drawing Sheets

METHOD OF PREPARING ZEOLITE Y

This is a continuation of application Ser. No. 07/566,037, filed on Aug. 13, 1990, now abandoned.

The present invention relates to a method of increasing the inner surface area of zeolite NaY which has a $SiO_2/Al_2O_3$ ratio of 4.0 to 5.9.

BACKGROUND OF THE INVENTION

It is known that mordenite can be treated with aqueous solution of NaOH at a pH greater than 10.5, in order to remove silicon dioxide.

The concentration of the sodium hydroxide solution can be 0.1 to 15N. The temperature is 0° to 100° C., preferably 25° to 75° C., and the treatment time is 5 minutes to 5 hours. This treatment increases the accessibility of the inner pores (see U.S. Pat. No. 3,326,797). These zeolites treated in this manner are used as hydrocracking catalysts or isomerization catalysts.

SUMMARY OF THE INVENTION

The present invention provides a method of increasing the inner surface area of zeolites of the NaY type which have a $SiO_2/Al_2O_3$ ratio of 4.0 to 6.5. In the method of the invention, an aqueous suspension of the NaY zeolite is treated with sodium hydroxide solution.

The suspension can have a pH of 10.5 to 14.

The temperature of the suspension can be 10° to 100° C.

In a preferred embodiment, the treatment of the NaY zeolite can be carried out directly after the synthesis in the filter system.

The invention also provides a method of preparing a hydrophobic zeolite Y by dealuminizing zeolite NaY which has a ratio of $SiO_2 Al_2O_3 = 4.0$ to 6.5 by means of silicon tetrachloride at temperatures between 300° and 480° C., using, as starting material, an NaY zeolite which has been treated in aqueous suspension with sodium hydroxide solution in the manner described above.

The dealuminization can be carried out according to known methods, for example, the method according to H. K. Beyer et al. in Imelik et al. Catalysis by Zeolites 1980 Elsevier, Scientific Publishing Company, Amsterdam, pp. 203 to 209, the disclosure of which is hereby incorporated by reference.

The method of the present invention has the advantage that in the case of the zeolite treated with sodium hydroxide solution, the dealuminization proceeds in a more complete fashion and produces better crystallinity.

DETAILED DESCRIPTION OF PREFERRED EMBODIMENTS

The invention is illustrated by the following specific examples.

The zeolite NaY used as starting material in the following examples has the following physico-chemical parameters:

| | |
|---|---|
| Elementary analysis (RFA): | $SiO_2/Al_2O_3 = 5.3$ |
| (RFA = X-ray fluorescence analysis) | $Na_2O/Al_2O_3 = 1.1$ |
| Annealing loss (1000° C.): | 25.3% |
| Specific surface according to BET (DIN 66 131, measuring gas: nitrogen, conditioning: 1 hour at 400° C.): | 770 m$^2$/g |
| Water absorption (68% rel. moisture, 20° C.): | 28.4% |
| Micropore volume: | 0.35 cm$^3$/g |

X-ray diffraction pattern cf. FIG. 1.

Example 1

67 g NaY zeolite are suspended in 100 ml distilled water. The pH of this suspension is 10.8. The pH is adjusted to 13 by adding in 4.8 ml sodium hydroxide solution (8.3% in aqueous solution) dropwise during 15 minutes. Thereafter, the solution is heated to 60° C. for 15 minutes. This temperature is maintained another 15 minutes. The zeolite is subsequently filtered and washed with 2 liters of distilled water until the pH of the wash water is <10 toward the end of the washing. The filtered zeolite is dried in a drying oven at 120° C. for 14 hours and then calcined at 400° C. for 1 hour.

| | |
|---|---|
| The specific surface according to BET is (after conditioning 1 hour at 400° C.) | 880 m$^2$/g. |
| The micropore volume is | 0.36 cm$^3$/g. |
| The elementary analysis (RFA) yields | $SiO_2/Al_2O_3 = 5.0$ |
| | $Na_2O/Al_2O_3 = 0.8$ |
| The water absorption is (68% rel. moisture, 20° C.) | 33.2%. |

FIG. 2 shows the X-ray diffraction pattern.

After the NaOH treatment, a part of the zeolite is resuspended. This suspension is acidified to pH 6.5 with 0.6 ml $H_2SO_4$ (d = 1.16 g/ml). A pH shift is not observed during the next 6 hours. After the treatment with acid, in which the pH of the suspension was adjusted to 6 to 7, the non-treated starting material (zeolite) exhibited a constant shift of the pH to the alkaline range, which had to be compensated by adding more acid.

EXAMPLE 2

Both an NaY zeolite treated according to Example 1 with NaOH and also an untreated NaY zeolite are dealuminized as follows with $SiCl_4$:

50.0 g zeolite are heated in a horizontally arranged glass tube (inner diameter: 7 cm, length of the reaction zone: 30 cm) under nitrogen (6 liters/hour) during 1.5 hours to 450° C. (measurement in the gaseous phase over the zeolite). After a further 30 minutes, 90.0 ml (60.0 g) $SiCl_4$, which had been converted into the gaseous state in an evaporator (75° C.), are passed at this temperature (450° C.) for 1 hour over the zeolite. Thereafter, the zeolite is allowed to cool down for 2 hours in the current of inert gas. 10 g of the product are suspended in 200 ml water, agitated 20 minutes, filtered and washed with 1 liter water. Finally, the zeolite obtained in this manner is dried 14 hours in a drying oven at 120° C. and then calcined 1 hour at 400° C.

For the zeolite treated with NaOH, the cell constant $a_0$ is determined at 24.23 A, for the untreated zeolite at 24.26 A (margin of error: ±0.03 A). As FIGS. 3 and 4 show, the X-ray crystallinity of the specimen obtained from treated NaY zeolite is higher than that of the specimen synthesized from untreated NaY zeolite. This is also reflected in the adsorption properties. Thus, at a p-xylene concentration of 1.0 g/m$^2$ in equilibrium, the first specimen (treated with NaOH) absorbs 18.2% of its weight and the other specimen, in contrast thereto, absorbs only 14.0% of its weight (20° C.). Conversely, in the case of the first specimen, the water adsorption, at 68% relative humidity, is 0.06 g water per zeolite which is lower than in the case of the second with 0.08 g. This is an indication that the dealuminization is more complete in the case of the treated zeolite and resulted in better crystallinity.

BRIEF DESCRIPTION OF FIGURES OF DRAWING

The drawings show the X-ray diffraction patterns of the various NaY zeolites.

Figure 1:
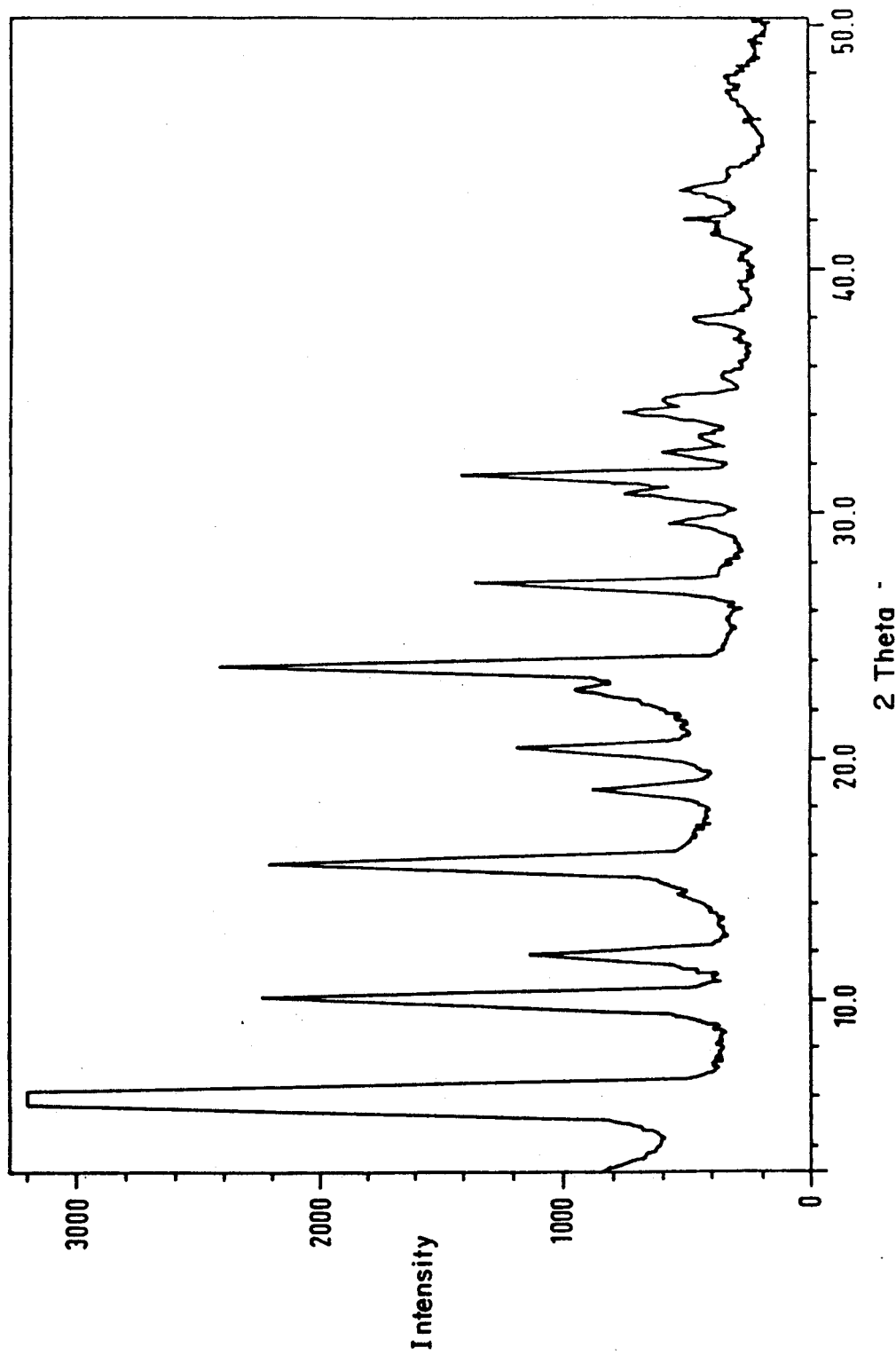
FIG. 1 shows the untreated zeolite NaY corresponding to the starting material and according to Example 2.
Figure 2:
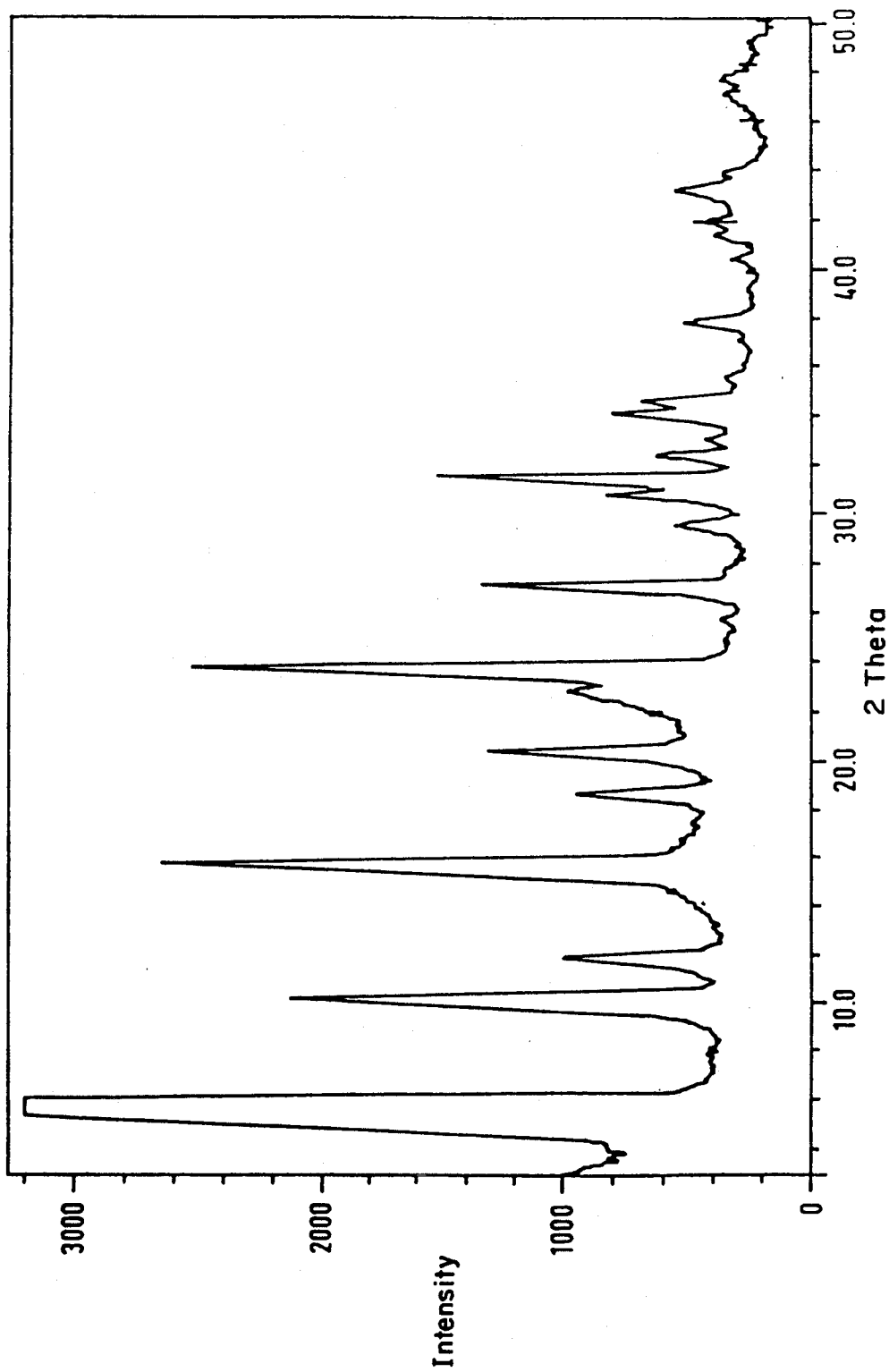
FIG. 2 shows the zeolite NaY treated with NaOH according to Examples 1 and 2.
Figure 3:
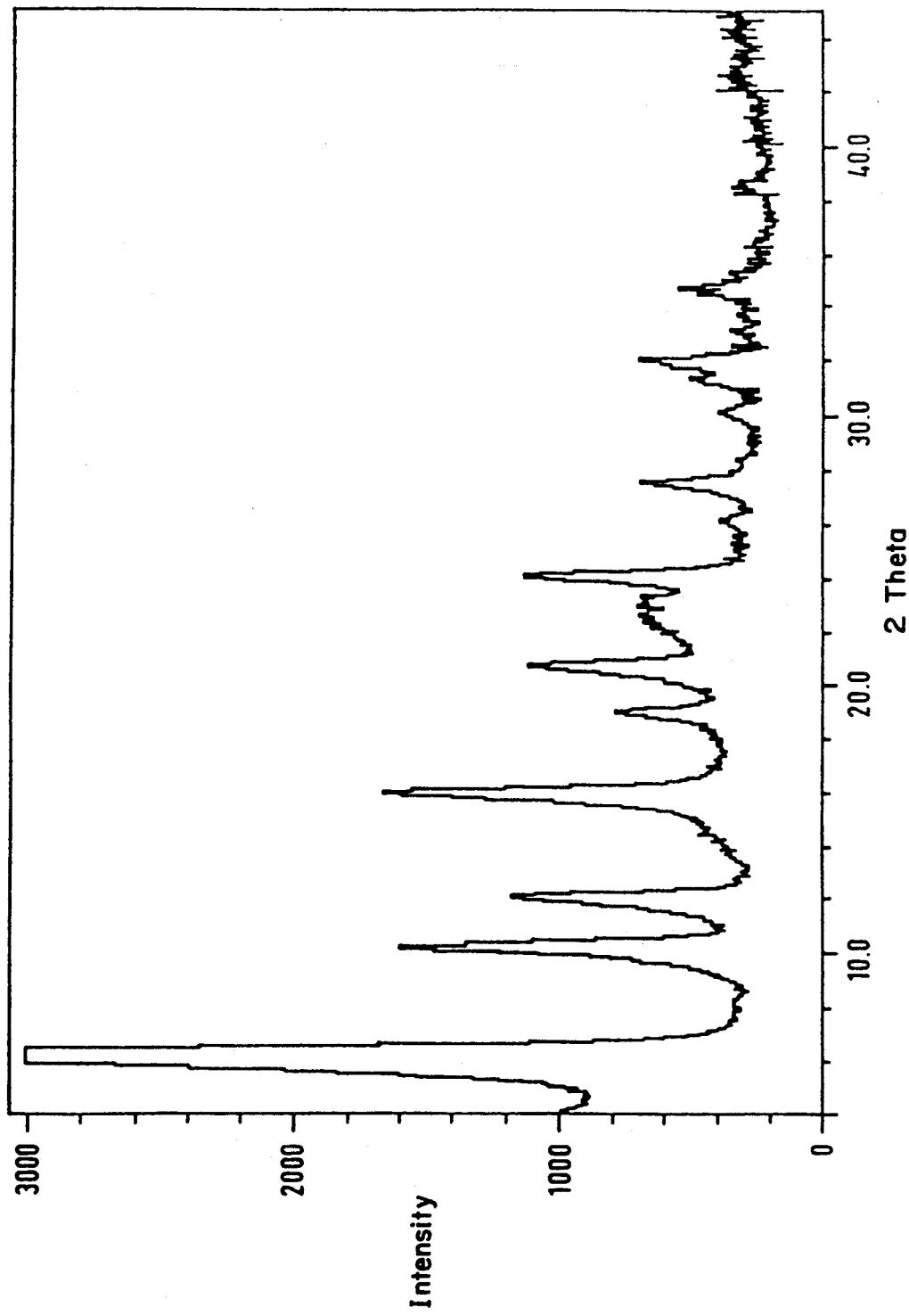
FIG. 3 shows the dealuminization product of the untreated zeolite NaY according to Example 2.
Figure 4:
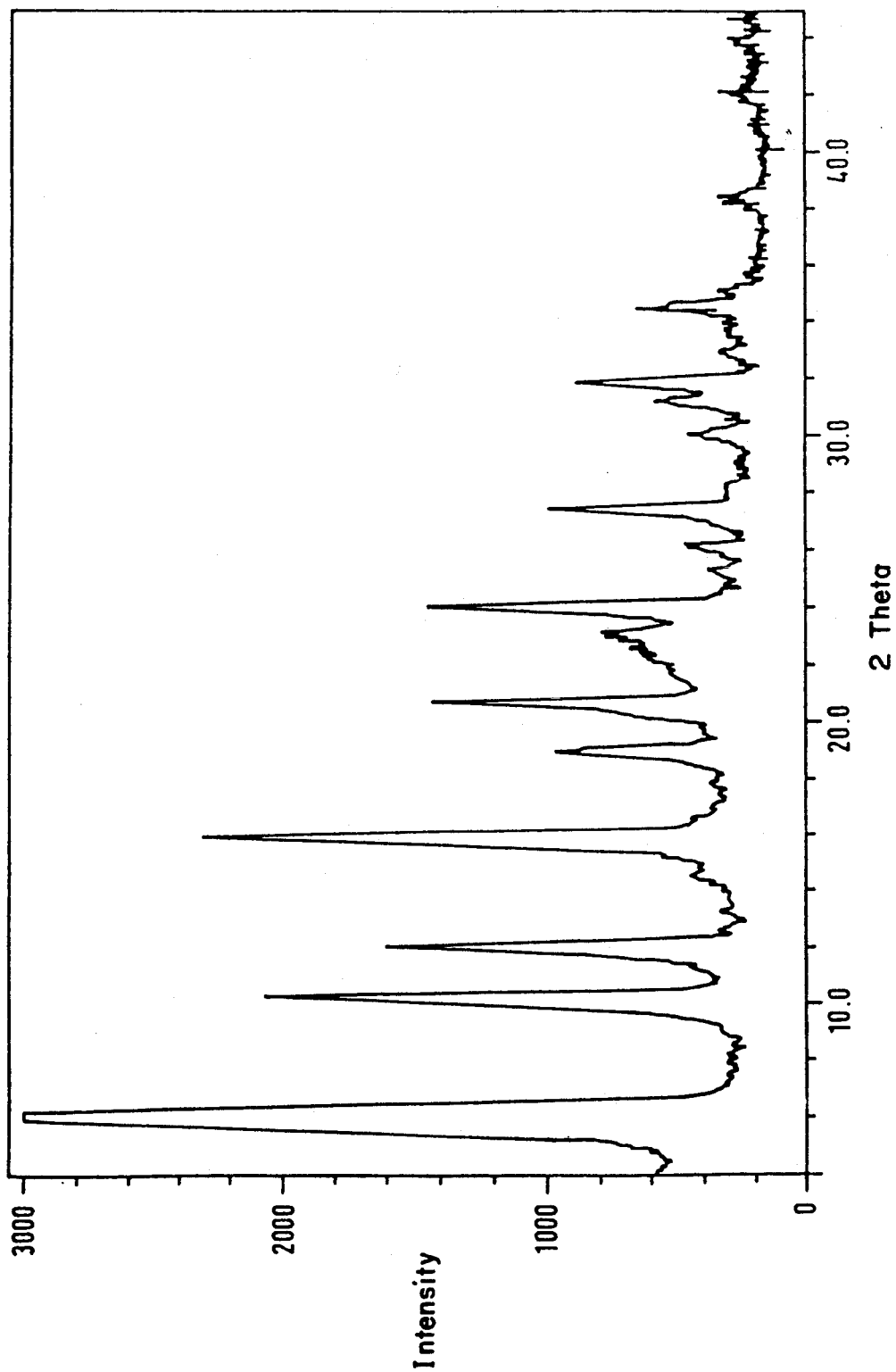
FIG. 4 shows the dealuminization product of the treated zeolite NaY according to Example 2.

What is claimed is:

1. A process for the production of a dealuminized zeolite Y having an $SiO_2:Al_2O_3$ ratio of 4.0-5.9, said process comprising treating an aqueous suspension of an NaY zeolite with a solution of sodium hydroxide at a pH of 10.5-14 and a temperature of 20°-100° C. and then dealuminizing the zeolite with silicon tetrachloride at a temperature of 300°-480° C.

2. The method of claim 1 in which the treatment of the zeolite is carried out immediately after the synthesis of the zeolite in a filter system.

* * * * *